US011365000B2

(12) United States Patent
Hayashida et al.

(10) Patent No.: US 11,365,000 B2
(45) Date of Patent: Jun. 21, 2022

(54) ROTORCRAFT INCLUDING VARIABLE BLADE TORSIONAL ANGLE MECHANISM

(71) Applicant: KAWASAKI JUKOGYO KABUSHIKI KAISHA, Kobe (JP)

(72) Inventors: Atsushi Hayashida, Kakamigahara (JP); Tadashi Wakatsuki, Seki (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 19 days.

(21) Appl. No.: 16/898,458

(22) Filed: Jun. 11, 2020

(65) Prior Publication Data

US 2021/0047031 A1 Feb. 18, 2021

Related U.S. Application Data

(63) Continuation of application No. PCT/JP2018/046181, filed on Dec. 14, 2018.

(30) Foreign Application Priority Data

Dec. 14, 2017 (JP) .............................. JP2017-239653

(51) Int. Cl.
  *B64C 27/605* (2006.01)
  *B64C 27/06* (2006.01)
  *B64C 27/473* (2006.01)
  *B64C 27/68* (2006.01)

(52) U.S. Cl.
  CPC ............ *B64C 27/605* (2013.01); *B64C 27/06* (2013.01); *B64C 27/473* (2013.01); *B64C 27/68* (2013.01)

(58) Field of Classification Search
  CPC ...... B64C 27/473; B64C 27/605; B64C 27/68
  See application file for complete search history.

(56) References Cited

U.S. PATENT DOCUMENTS

| 8,876,036 | B2 | 11/2014 | McCollough et al. |
| 9,139,297 | B1* | 9/2015 | White .................. B21D 53/78 |
| 9,487,291 | B2 | 11/2016 | Zientek et al. |
| 2013/0156575 | A1 | 6/2013 | Stamps |
| 2014/0154074 | A1* | 6/2014 | Zientek ................. B64C 27/463 416/1 |

FOREIGN PATENT DOCUMENTS

| EP | 2796368 A1 | 10/2014 |
| EP | 3246247 A1 * | 11/2017 ........... B64C 27/473 |

(Continued)

*Primary Examiner* — Timothy D Collins
*Assistant Examiner* — Justin Michael Heston
(74) *Attorney, Agent, or Firm* — Xsensus LLP

(57) ABSTRACT

A rotor craft changes a torsional angle of a blade by driving an actuator. The rotor craft includes a plurality of torsion applying mechanisms that each twist a proximal end portion of a corresponding blade relative to a distal end portion of the corresponding blade about a center axis A of the blade. Each blade includes a spar having a proximal end portion connected to a hub and a skin in which the spar is inserted, such that a distal end portion of the skin and a distal end portion of the spar are connected to each other, and such that other portions of the skin than the distal end portion are rotatable relative to the spar about a center axis of the spar. The hub includes a hub body mounted to a main rotor shaft, and a hub arm that connects the spar to the hub body.

20 Claims, 9 Drawing Sheets

(56) References Cited

FOREIGN PATENT DOCUMENTS

| | | | | |
|---|---|---|---|---|
| EP | 3360780 A1 | * | 8/2018 | ......... B64C 29/0033 |
| FR | 2855811 A1 | * | 12/2004 | ............ B64C 27/82 |
| GB | 1047568 A | | 11/1966 | |
| GB | 2464678 A | | 4/2010 | |
| JP | 63-287695 A | | 11/1988 | |
| WO | 98/30446 A2 | | 7/1998 | |
| WO | 2004/045948 A1 | | 6/2004 | |

* cited by examiner

ROTORCRAFT INCLUDING VARIABLE BLADE TORSIONAL ANGLE MECHANISM

CROSS-REFERENCE TO RELATED APPLICATIONS

The present application is a bypass continuation of PCT Filing PCT/JP2018/046181, filed Dec. 14, 2018, which claims priority to JP 2017-239653, filed Dec. 14, 2017, both of which are incorporated by reference in their entirety.

TECHNICAL FIELD

The present application relates to a rotor craft that flies by generating lift with rotor blades.

BACKGROUND ART

Conventionally, blade shapes of manned or unmanned rotor crafts, such as helicopters, are fixedly designed. While the blade is rotating, speeds of different portions of the blade in the longitudinal direction thereof relative to the air are different from each other. Accordingly, lift that is generated while the blade is rotating varies at different positions on the blade depending on the distance from the rotor shaft. In many rotor crafts, in order to reduce such variation in the lift, different torsional angles (wash-out angles) are imparted corresponding to different positions on the blade. However, these torsional angles are also fixedly set for the corresponding positions on the blade.

However, the required performance of the blade during hovering is different from the required performance of the blade during flying forward. Moreover, even while the aircraft is flying forward, the moving state of the rotating blade relative to the aircraft body switches between a forward-moving state and a rearward-moving state, and the ideal required performance of the blade in the forward-moving state is different from the ideal required performance of the blade in the rearward-moving state. In light of these, various techniques for making the torsional angle of the blade variable have been proposed to achieve various required performances during flying.

A first proposed technique is a configuration in which a weight is provided on the distal end of a blade, and the weight is shifted in the blade width direction at a suitable timing to shift the position of the center of gravity of the blade. Thus, the torsional angle of the blade is changed by utilizing the function of centrifugal force exerted on the rotating blade (i.e., weight shifting type).

In a second proposed technique, a torque tube is inserted in a blade whose proximal end portion is connected to the hub of the rotor, and the distal end portion of the torque tube is connected to the distal end portion of the blade. The rotor applies rotating force about the center axis of the torque tube to the proximal end portion of the torque tube, thereby twisting the distal end portion of the blade relative to the proximal end portion of the blade (i.e., torque tube type).

There are also other proposed techniques. For example, there is a technique in which a movable flap is provided on the distal end trailing edge of a blade. By driving the flap, the blade is twisted by utilizing aerodynamic force (i.e., flap driving type). There is also a technique in which an electric current is applied to a piezoelectric element embedded in the skin, and thereby the skin is forcibly deformed (i.e., forced displacement type).

These proposed techniques have problems. In the case of the weight shifting type rotor of the first proposed technique, it is necessary to incorporate an actuator and a weight in the distal end of the blade. This unfavorably causes increase in the weight of the blade. The moving state of the blade switches between the forward-moving state and the rearward-moving state with a high cycle. It is difficult to realize precise weight-shifting control with such a high cycle.

In the case of the torque tube type of the second proposed technique, given that the point of effort at which torsional force is applied to the blade (i.e., the proximal end portion of the torque tube) is greatly spaced apart from the point of load at which the blade is to be twisted (i.e., the distal end portion of the torque tube), the torque tube is required to have significantly high torsional stiffness. The torque tube of the second proposed technique, which is additionally attached to the inside of a conventional blade structure, cannot have a sufficient cross-sectional area.

The torsional stiffness of the torque tube having such a small cross-sectional area is much less than the torsional stiffness of the blade. For this reason, when the torsional force is applied in order to twist the blade by a desired angle, the torsional force causes such torsional deformation of the torque tube that the torque tube is twisted by an angle that is many times as great as the desired angle. Thus, in order to twist the blade by the desired angle, a great angular displacement, i.e., the torsional angle of the blade combined with the torsional angle of the torque tube, which is many times as great as the torsional angle of the blade, needs to be imparted to the proximal end portion of the torque tube. In such a case, the displacement of the actuator is significantly great, and also, there would be a problem of poor responsiveness. Accordingly, in this case, an actuator with a great stroke and high power is required, which causes increase in the weight and cost. In addition, in this case, a great torsional shear stress due to the torsional force is exerted on the torque tube. This causes a technical problem in terms of strength.

In the case of the aforementioned flap driving type, it is necessary to equip the rotating blade with a mechanism that drives the flap. This makes the structure complicated. Further, in the case of the forced displacement type, a relatively high voltage is required in order to drive the piezoelectric element, and also, depending on the size of the piezoelectric element, the blade cannot be sufficiently displaced.

SUMMARY

In order to solve the above-described problems, a rotor craft according to the present application including a rotor shaft, a plurality of blades that rotate about the rotor shaft, a hub that couples the plurality of blades to the rotor shaft, and a plurality of torsion applying mechanisms, each torsion applying mechanism of the plurality of torsion applying mechanisms twisting a proximal end portion of a corresponding blade of the plurality of blades relative to a distal end portion of the corresponding blade about a center axis of the blade. Each blade of the plurality of blades includes a spar constituted by a long shaft-shaped structural member, the spar including a proximal end portion that is connected to the hub, and a skin in which the spar is inserted, such that a distal end portion of the skin and a distal end portion of the spar are connected to each other, and such that portions of the skin other than the distal end portion are rotatable relative to the spar about a center axis of the spar. The hub includes, a hub body mounted to the rotor shaft, and a hub arm that connects the spar to the hub body.

The rotor craft with the above configuration applies rotating force to the proximal end portion of the skin, thereby directly imparting a torsional angle to the proximal end portion of the skin.

The rotor craft may further include a pitch-changing mechanism, which changes a pitch of each blade of the plurality of blades. the pitch-changing mechanism may include: a swash plate; and a plurality of pitch links having a first end connected to the swash plate and having a second end connected to the hub arm.

Each of the torsion applying mechanisms may include an actuator that applies rotating force about the center axis of the spar to a proximal end portion of the skin, the actuator being provided on the hub arm. Each of the torsion applying mechanisms may include an actuator that applies rotating force about the center axis of the spar to a proximal end portion of the skin, the actuator being provided at a position different from the hub arm. Alternatively, each of the torsion applying mechanisms may include a second swash plate that applies rotating force about the center axis of the spar to a proximal end portion of the skin.

Each of the torsion applying mechanisms may include an arm that connects between the actuator and a leading edge portion or a trailing edge portion of the proximal end portion of the skin. Each of the torsion applying mechanisms may include an arm that connects between the second swash plate and a leading edge portion or a trailing edge portion of the proximal end portion of the skin.

At least a partial segment of the spar in a longitudinal direction of the spar may form a flattened cross-sectional shape, such that a dimension of the cross-sectional shape in a forward-rearward direction is greater than a dimension of the cross-sectional shape in an upward-downward direction. At least a portion of the skin, the portion being different from the distal end portion, may be rotatably supported on the spar via a bearing.

The spar may from a specific position in a longitudinal direction of the spar toward the distal end portion of the spar, a dimension of the cross-sectional shape in a forward-rearward direction and/or a dimension of the cross-sectional shape in an upward-downward direction increases gradually.

DETAILED DESCRIPTION OF THE DRAWINGS

Hereinafter, embodiments of the present application are described with reference to the drawings. In the description below, a helicopter is taken as one example of a rotor craft of the present application. However, the rotor craft of the present application is applicable not only to a helicopter, but also to any aircraft that includes rotor blades that generate thrust, regardless of whether the aircraft is a manned aircraft or an unmanned aircraft.

Figure 1:
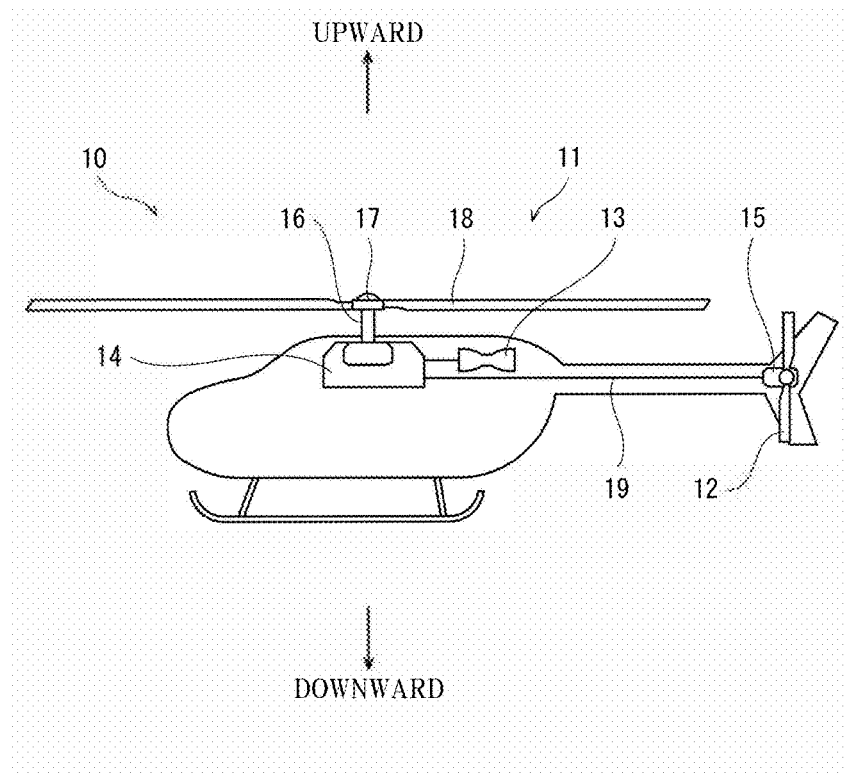
FIG. 1 is a schematic diagram showing a rotor craft according to an embodiment of the present application.

FIG. 1 is a schematic diagram showing a helicopter, which is one example of a rotor craft according to an embodiment of the present application. As schematically shown in FIG. 1, a helicopter 10 includes a main rotor 11, a tail rotor 12, an engine 13, a main transmission 14, and a tail transmission 15. Motive force from the engine 13 is transmitted to the main rotor 11 via the main transmission 14, and is then transmitted to the tail rotor 12 via a tail drive shaft 19 and the tail transmission 15.

The motive force from the main transmission 14 is transmitted to the main rotor 11 via a main rotor shaft 16. One end of the main rotor shaft 16 is connected to the transmission 14, and the other end is connected to a hub 17. A plurality of blades (rotor blades) 18 of the main rotor 11 are connected to the hub 17. It should be noted that, in the description below, for the sake of convenience, the side on which the main rotor shaft 16 is connected to the transmission 14 is defined as the lower side, and the side on which the main rotor shaft 16 is connected to the hub 17 is defined as the upper side.

Figure 2:
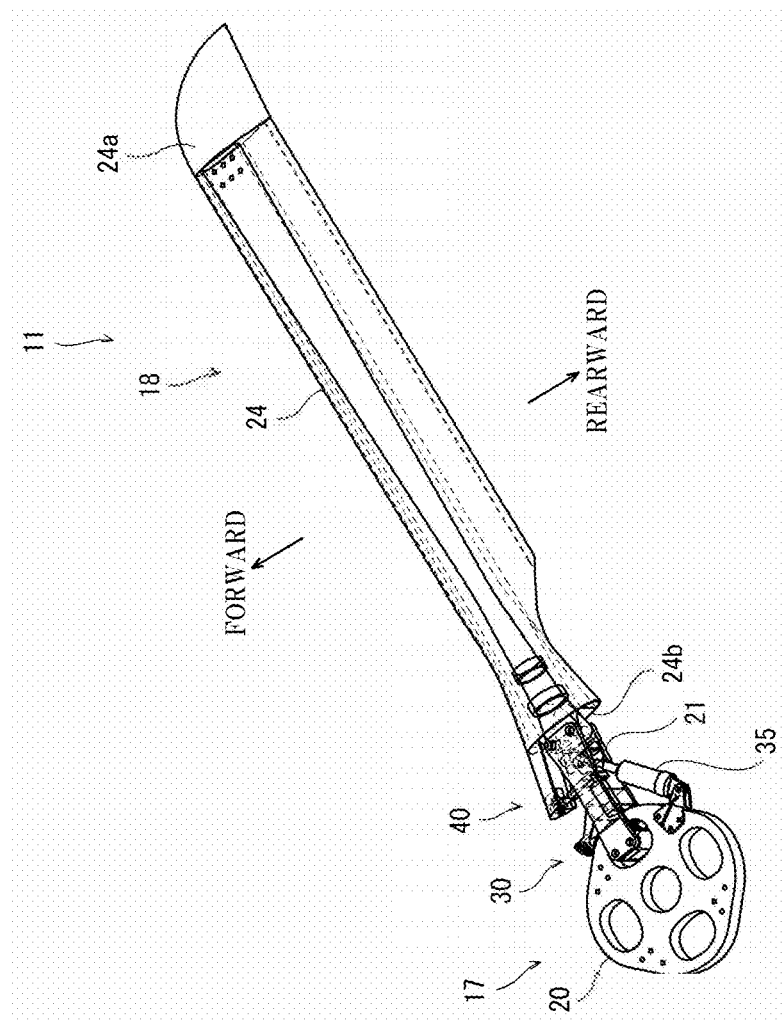
FIG. 2 is a perspective view showing a hub and a blade of a main rotor.
Figure 3:
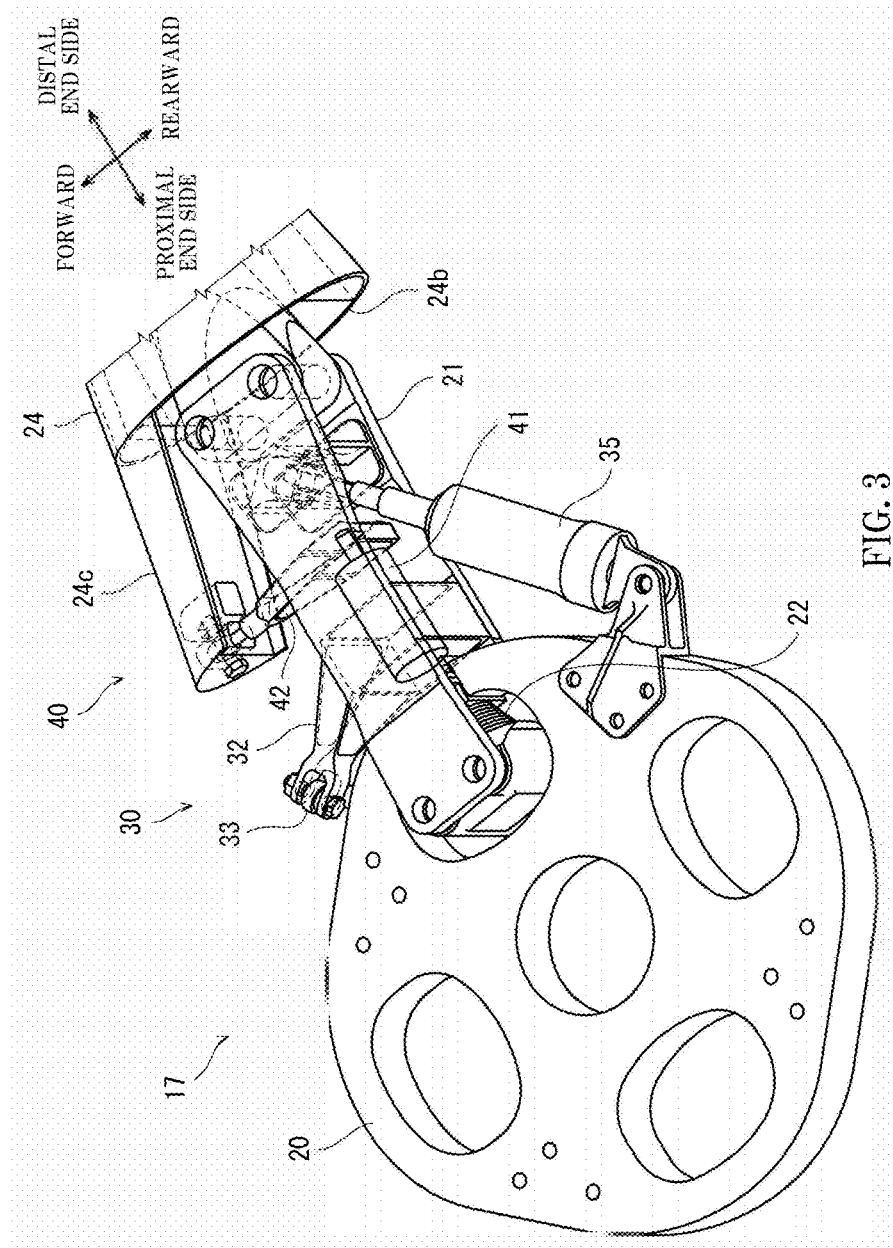
FIG. 3 is a perspective view showing a blade-mounting portion of FIG. 2.
Figure 4:
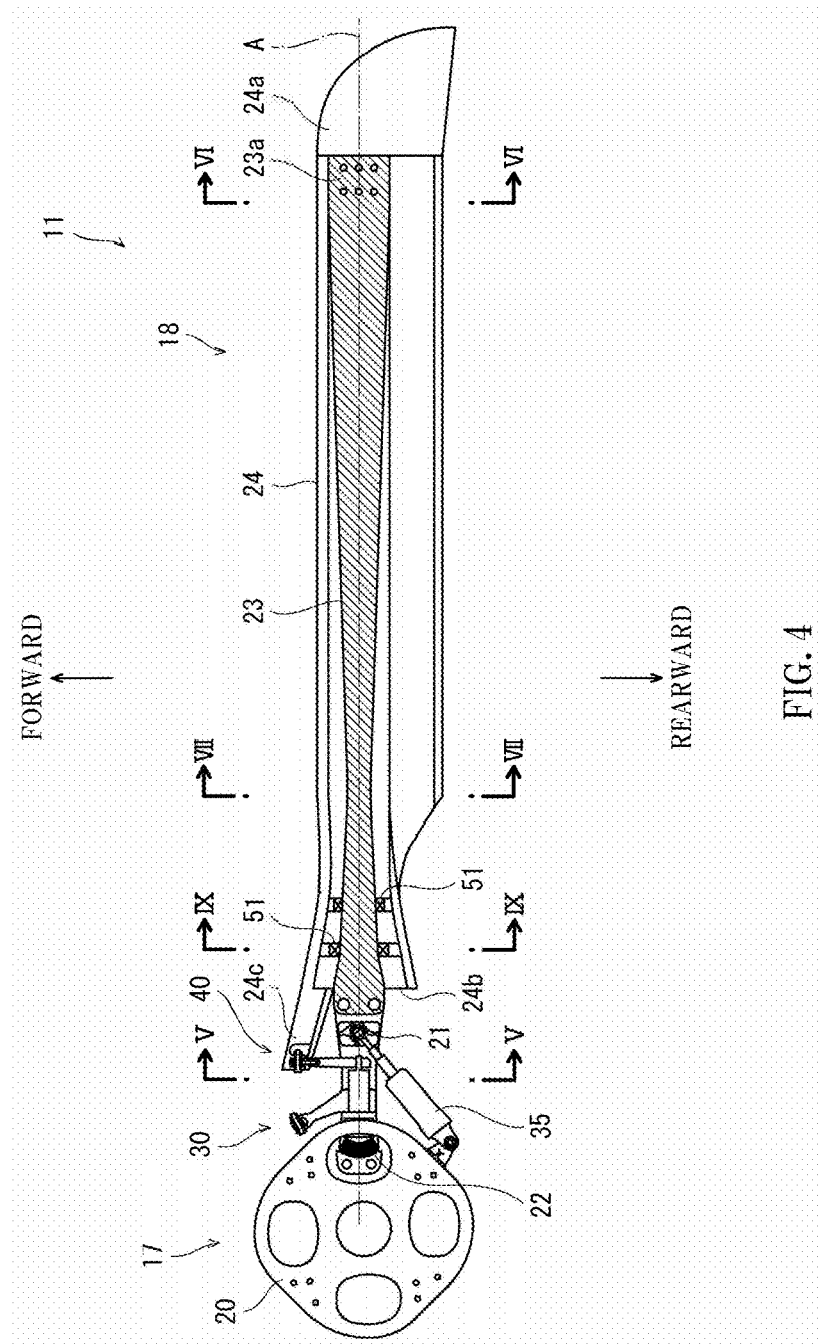
FIG. 4 is a plan view of the hub and blade of the main rotor shown in FIG. 2.
Figure 5:
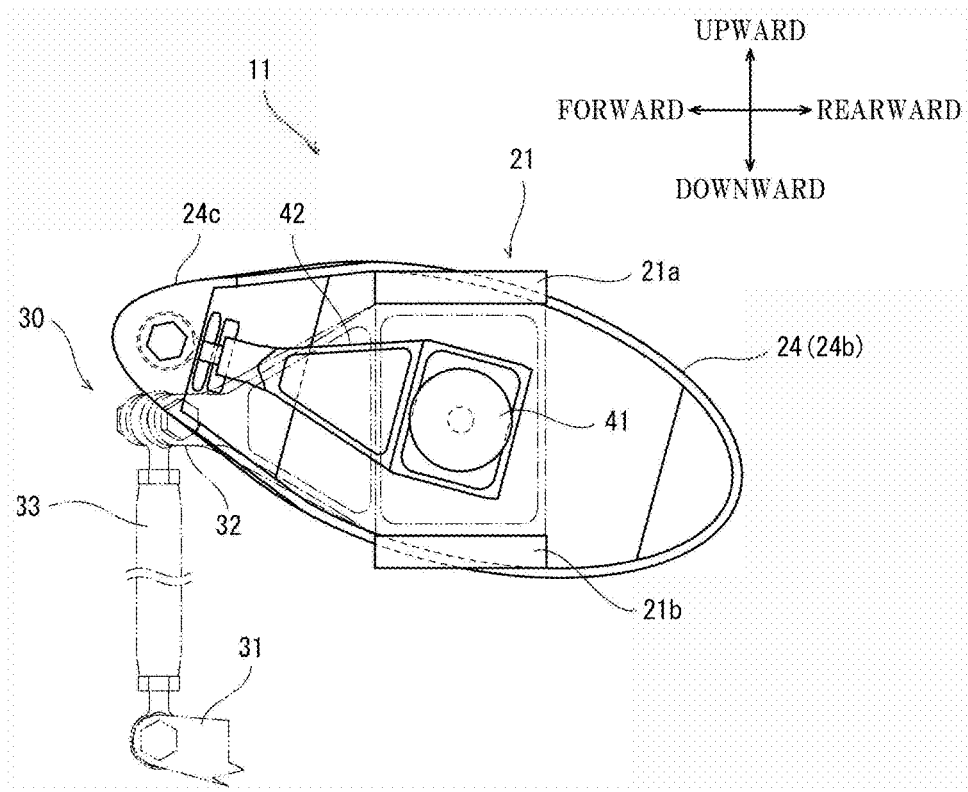
FIG. 5 is a cross-sectional view taken along line V-V of FIG. 4.

FIG. 2 is a perspective view showing a part of the main rotor 11. FIG. 2 shows the hub 17 and one blade 18 connected to the hub 17. FIG. 3 is a perspective view showing, in an enlarged manner, a blade-mounting portion at which the hub 17 and the blade 18 shown in FIG. 2 are connected to each other. FIG. 4 is a plan view showing an internal structure of a part of the main rotor 11 shown in FIG. 2. FIG. 5 is a cross-sectional view taken along line V-V of FIG. 4. It should be noted that, in the drawings, an advancing direction of the blade 18 is defined as forward, and a direction opposite the advancing direction is defined as rearward.

As shown in FIG. 4, the main rotor 11 includes the hub 17 and the blade 18. The hub 17 includes a hub body 20 and a hub arm 21. The hub body 20 is connected to the upper end portion of the main rotor shaft 16, and rotates together with the main rotor shaft 16. The hub arm 21 connects the proximal end portion of the blade 18 to the hub body 20.

As illustrated in the drawings, hub arm 21 serves as a tension link and, as a result, in this discussion, hub arm 21 is also referred to as tension link 21. The tension link 21 has an elongated shape, and is disposed such that the longitudinal direction of the tension link 21 coincides with the radial direction extending from the main rotor shaft 16. The proximal end portion of the tension link 21, which is one of both end portions of the tension link 21 and which is the closer end portion to the main rotor shaft 16, is connected to the hub body 20 via a connecting member 22, which is, for example, an elastomeric bearing. The connecting member 22 enables motions of the blade 18 (flapping motion, lead-lag motion, and feathering motion) about three respective axes.

As shown in FIG. 5, the main rotor 11 is provided with a pitch-changing mechanism 30 (see also FIGS. 2-4). The pitch-changing mechanism 30 includes a disc-shaped swash plate 31, a pitch arm 32 for each blade, and a pitch link 33 for each blade. Below the hub body 20, the swash plate 31 is disposed coaxially with the main rotor shaft 16. From the vicinity of the center of the tension link 21 in the longitudinal direction thereof, the pitch arm 32 extends in the horizontal direction (in FIG. 5, forward direction) substantially orthogonally to the longitudinal direction. From the distal end portion of the pitch arm 32, the pitch link 33 extends downward. The pitch link 33 is, at its lower end, coupled to the swash plate 31.

Accordingly, upward/downward motion and inclination of the swash plate 31 are transmitted to the tension link 21 via the pitch link 33 and the pitch arm 32, and thereby the pitch of the blade 18 connected to the tension link 21 is changed. It should be noted that, as shown in FIG. 5, the tension link 21 includes an upper member 21a and a lower member 21b, each of which is strip-shaped and which are arranged to be spaced apart from each other in the upward-downward direction. The proximal end portion of the pitch arm 32 is supported in such a manner that it is sandwiched by these upper member 21a and lower member 21b from above and below.

As shown in FIG. 4, a lead-lag damper 35, which damps the lead-lag motion of the blade 18, is also mounted to the tension link 21. The lead-lag damper 35 is, for example, a hydraulic damper. The proximal end portion of the lead-lag damper 35 is connected to the hub body 20 at a position near behind the mounting position of the tension link 21, and the distal end portion of the lead-lag damper 35 is connected to the tension link 21.

The proximal end portion of a long shaft-shaped spar 23, which is a structural member of the blade 18, is connected to the distal end portion of the tension link 21. The blade 18 includes a skin 24, in which the spar 23 is inserted. A cross section of the skin 24 orthogonal to the longitudinal direction thereof forms a specific airfoil contour shape. The spar 23 and the skin 24 are connected to each other at their distal end portions 23a and 24a (i.e., farther end portions from the main rotor shaft 16). Except at the distal end portions 23a and 24a, the skin 24 is not fixedly connected to the spar 23. Accordingly, except at the distal end portion 24a, the skin 24 is rotatable about the center axis A of the spar 23. In other words, displacement of the other portions of the skin 24 than the distal end portion 24a in a twisting direction about the center axis A is not directly restrained by the spar 23.

Figure 6:
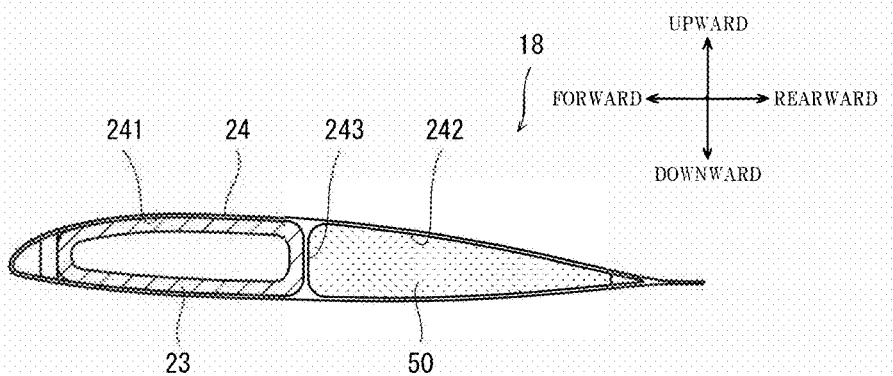
FIG. 6 is a cross-sectional view taken along line VI-VI of FIG. 4.

FIG. 6 is a cross-sectional view of the distal end portion of the blade 18 along line VI-VI of FIG. 4.

As shown in FIG. 6, at the distal end portion of the blade 18, the spar 23 is inserted in and fixed to the skin 24 without any gap formed therebetween. To be more specific, the skin 24 forms the outer skin of the blade 18. The skin 24 is made of, for example, a fiber reinforced composite material. The cross section of the skin 24 has a specific contour shape corresponding to a position on the blade 18 in the longitudinal direction of the blade 18. At the distal end position on the blade 18 shown in FIG. 6, such an airfoil shape that the dimension thereof in the forward-rearward direction is greater than the dimension thereof in the upward-downward direction, i.e., a flattened airfoil shape, is formed. Inside the skin 24, the spar 23 is inserted in a front space 241, and a light-weight and high-strength filler 50 is accommodated in a rear space 242. The filler 50 is, for example, a foamed plastic core or a honeycomb core.

The shape of the outer surface of a part of the spar 23, the part being shown in FIG. 6, substantially matches the shape of the inner surface of a part of the front space 241 of the skin 24, the part being shown in FIG. 6. Also, at these parts shown in FIG. 6, the spar 23 and the skin 24 are fixedly connected to each other by fastening means, such as an adhesive or a fastener. Thus, at the distal end portion of the blade 18, the spar 23 and the skin 24 are integrated together. It should be noted that a dividing wall 243, which divides the front space 241 and the rear space 242 from each other, is provided between the front space 241 and the rear space 242 in the skin 24.

Figure 7:
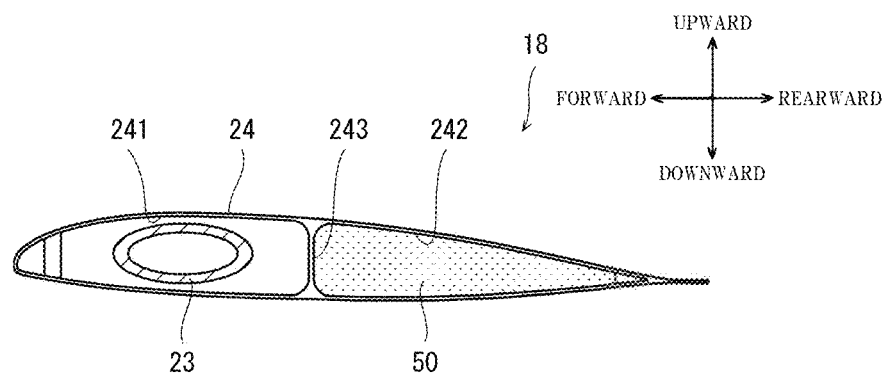
FIG. 7 is a cross-sectional view taken along line VII-VII of FIG. 4.

FIG. 7 is a cross-sectional view of a non-end portion of the blade 18 along line VII-VII of FIG. 4.

As shown in FIG. 7, at the non-end portion of the blade 18, the spar 23 is inserted in the skin 24 with a gap formed therebetween. To be more specific, similar to the distal end portion of the blade 18 shown in FIG. 6, the filler 50 is accommodated in the rear space 242 of the skin 24. On the other hand, the spar 23 passed through the front space 241 of the skin 24 has a cross section that is smaller in dimension than the cross section of the front space 241, and is positioned to be spaced apart from every part of the inner surface of the front space 241.

Figure 8:
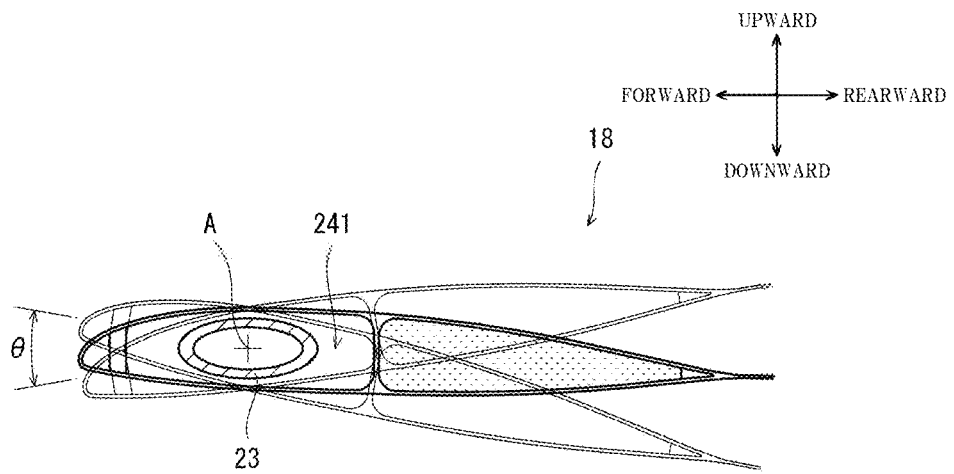
FIG. 8 is a schematic diagram showing a state where the blade shown in FIG. 7 is twisted about a center axis.

In the example shown in FIG. 7, the spar 23 has such an ellipsoidal cross-sectional shape that the dimension of the cross-sectional shape in the forward-rearward direction is greater than the dimension of the cross-sectional shape in the upward-downward direction. As shown in FIG. 8, the cross-sectional shape and the cross-sectional dimensions of the spar 23 are defined such that, even when the skin 24 rotates in the upward-downward direction relative to the spar 23, the spar 23 does not come into contact with the inner surface of the skin 24, so long as the upward-downward rotation of the skin 24 relative to the spar 23 is within a specific range of a rotation angle θ (an angle about the center axis A). As shown in FIG. 8, the blade 18 of FIG. 7 is twisted about center axis A, and is thus displaced.

Figure 9:
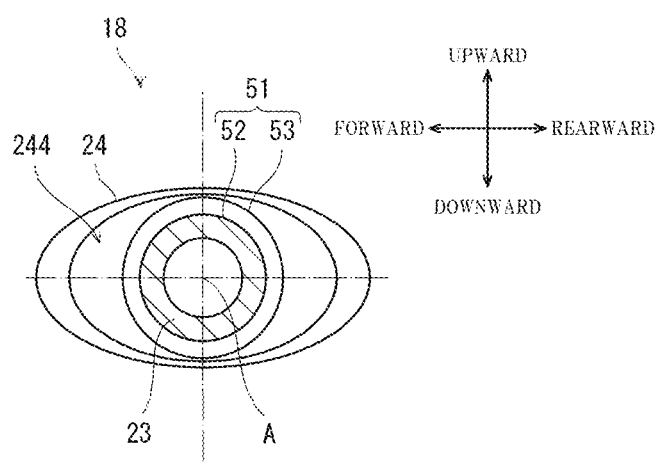
FIG. 9 is a cross-sectional view taken along line IX-IX of FIG. 4.

FIG. 9 is a cross-sectional view of the proximal end portion of the blade 18 along line IX-IX of FIG. 4.

As shown in FIG. 9, at the proximal end portion of the blade 18, the spar 23 is inserted in the skin 24 with a gap formed therebetween. However, the skin 24 is supported on the spar 23 via bearings 51. To be more specific, at the proximal end portion of the blade 18, the spar 23 has a substantially circular or ellipsoidal cross-sectional shape, and the skin 24 has such an ellipsoidal cross-sectional shape that the dimension of the cross-sectional shape in the forward-rearward direction is greater than the dimension of the cross-sectional shape in the upward-downward direction. Unlike the above-described distal end portion and non-end portion of the blade 18, the interior of the skin 24 of the proximal end portion of the blade 18 is not divided into the front space 241 and the rear space 242, but instead, a single interior space 244 is formed. In the interior space 244, the spar 23 is disposed at such a position that the spar 23 does not contact any part of the inner surface of the skin 24.

Each annular bearing 51 is interposed between the spar 23 and the skin 24, which are positioned to be spaced apart from each other in the above-described manner. The bearing 51 is, for example, a known bearing such as ball bearing, roller bearing, or slide bearing. The bearing 51 includes an inner ring 52 and an outer ring 53, which are rotatable relative to each other. The inner ring 52 is supported in such a manner that it is fitted to the outside of the spar 23 (via a specific support member, if necessary). The outer ring 53 is positioned in the interior space 244 of the skin 24, and is supported on the inner surface of the skin 24 via a specific support member. Thus, the skin 24 is rotatable relative to the spar 23 about the rotational axis of the bearing 51 (the rotational axis of the bearing 51 coincides with the center axis A) in such a manner that no positional shift of the rotational center of the skin 24 occurs. It should be noted that, in the example shown in FIG. 4, the bearings 51 are provided at two positions of the proximal end portion of the blade 18, respectively, the two positions being spaced apart from each other in the direction of the center axis A. Alternatively, the bearings 51 may be provided at any number of positions in accordance with the design.

The blade 18 is provided with a torsion applying mechanism 40. The torsion applying mechanism 40 is provided in a manner to connect between a proximal end portion 24b of the skin 24 and the tension link 21. Accordingly, the proximal end portion of the blade 18 (the skin 24) can be twisted relative to the distal end portion thereof about the center axis A.

To be more specific, the torsion applying mechanism 40 includes a rotary actuator (actuator) 41 and a twisting arm (arm) 42. The rotary actuator 41 is provided on the tension link 21, and in the example shown in FIG. 4 and FIG. 5, the rotary actuator 41 is supported by the proximal end portion of the pitch arm 32 between the upper member 21a and the lower member 21b (in this example, at a position that is closer to the hub body 20 than a connecting point between the lead-lag damper 35 and the tension link 21). The rotary actuator 41 is, for example, an electric motor, and is disposed such that the output shaft of the rotary actuator 41 coincides with the center axis A. The output shaft is directed outward along the center axis A (in a direction away from the main rotor shaft 16).

The proximal end portion of the twisting arm 42 is connected to the output shaft of the rotary actuator 41, and the twisting arm 42 extends forward. The distal end portion of the twisting arm 42 is connected to a leading edge portion 24c of the proximal end portion 24b of the skin 24. Accordingly, when the rotary actuator 41 is driven by a signal from a controller, the output shaft of the rotary actuator 41 rotates, and the twisting arm 42 rotates about the output shaft, thereby applying torsional force to the proximal end portion 24b of the skin 24. It should be noted that, as another form of the torsion applying mechanism 40, the twisting arm 42 may be extended rearward from the tension link 21 and connected to the trailing edge portion of the proximal end portion 24b of the skin 24. Alternatively, twisting arms 42 may be extended from the tension link 21 forward and rearward, respectively, and may be connected to the leading edge portion 24c and the trailing edge portion of the proximal end portion 24b of the skin 24, respectively. In this case, the position at which the lead-lag damper 35 and the tension link 21 are connected to each other may be changed as necessary, such that the layout of the twisting arms 42 and the layout of the lead-lag damper 35 do not interfere with each other.

With the above configuration, in the main rotor 11 of the helicopter 10 according to the present disclosure, by applying a drive signal to the rotary actuator 41, the proximal end portion 24b of the blade 18 (skin 24) can be twisted relative to the distal end portion 24a about the center axis A by a desired angle at an intended timing.

Figure 10:
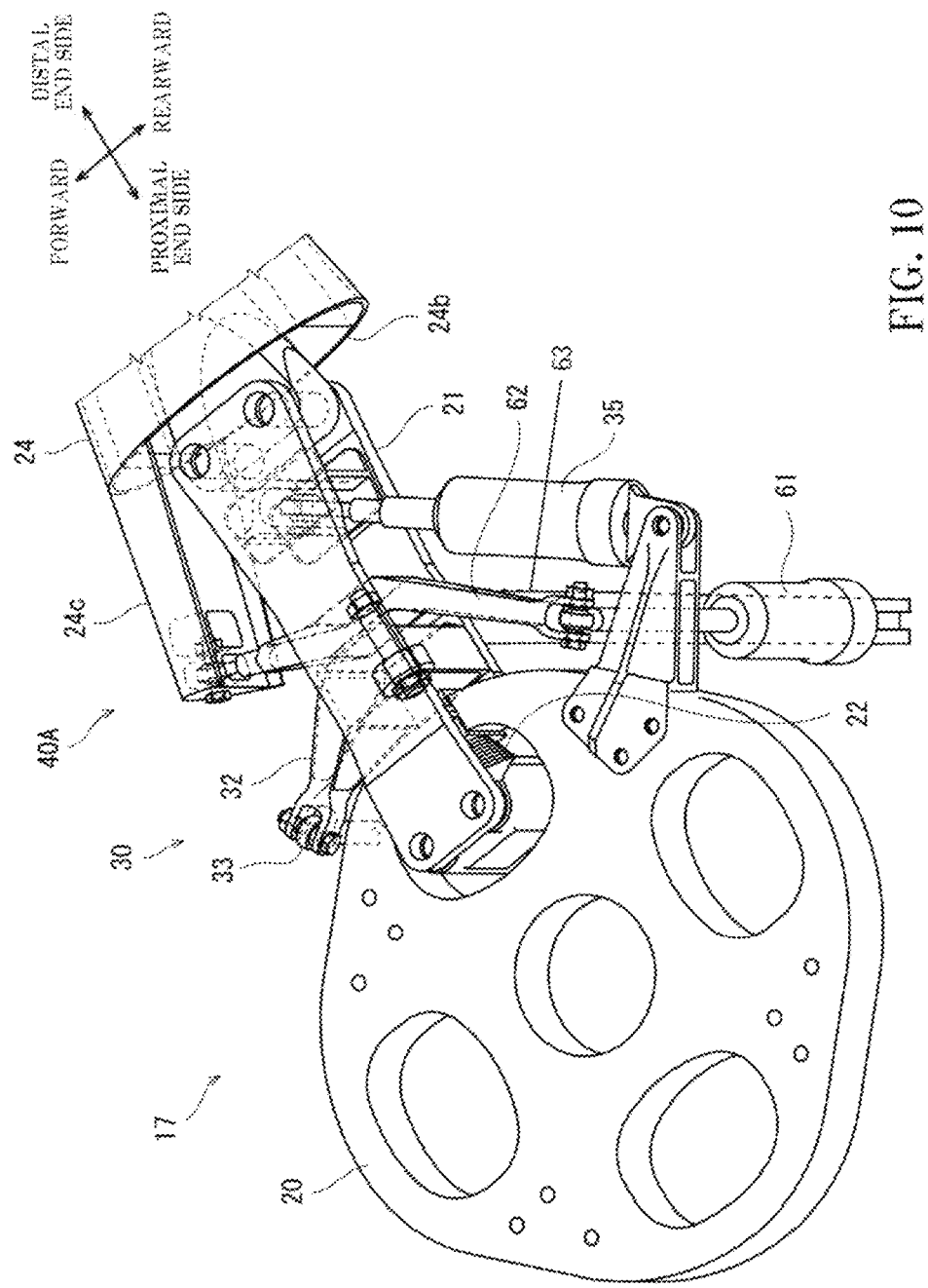
FIG. 10 is a perspective view showing another exemplary implementation of a blade-mounting portion.

FIG. 10 shows another exemplary implementation of a blade-mounting portion, torsion applying mechanism 40A. The torsion applying mechanism 40A is configured to apply torsional force to the proximal end portion 24b of the skin 24 not by driving the rotary actuator 41 mounted to the tension link 21, but by driving a linear actuator 61, which is provided at a position different from the tension link 21.

To be more specific, the torsion applying mechanism 40A shown in FIG. 10 includes the linear actuator 61 near behind the tension link 21. The linear actuator 61 is provided upright on a specific member that rotates together with the main rotor shaft 16, and the linear actuator 61 is extendable and retractable in the upward-downward direction. The rear end portion of a rod-shaped link member (an arm) 62 is rotatably connected to the upper end portion of the linear actuator 61. The leading edge portion 24c of the proximal end portion 24b of the skin 24 is rotatably connected to the front end portion of the link member 62. In this case, the lower end portion of the linear actuator 61 may be fixed to anywhere, so long as torsional force can be applied to the proximal end portion 24b. For example, the lower end portion of the linear actuator 61 may be fixed to the tension link 21 via a fitting 63. As one example, FIG. 10 shows a configuration in which the linear actuator 61 is fixed to the lower member 21b of the tension link 21 via the fitting 63. The link member 62 is disposed in a manner to extend through the tension link 21 in the forward-rearward direction between the upper member 21a and the lower member 21b. A non-end portion of the link member 62 in the longitudinal direction thereof is pivotally supported by the tension link 21.

Accordingly, when the linear actuator 61 is driven to extend or retract, the link member 62 moves like a lever. At the time, a part of the tension link 21, the part pivotally supporting the link member 62, acts as a fulcrum. As a result, torsional force is applied to the proximal end portion 24b of the skin 24. In the example of FIG. 10, the link member 62 is disposed in the space between the lead-lag damper 35 and the hub body 20, and thus contributes to reduction in the size of the structure near the hub 17 of the main rotor 11.

It should be noted that the arrangement of the torsion applying mechanism 40A may be reversed in the forward-rearward direction. Specifically, the linear actuator 61 may be disposed near in front of the tension link 21; the upper end portion of the linear actuator 61 may be connected to the front end portion of the link member 62; and the rear end portion of the link member 62 may be connected to the trailing edge portion of the proximal end portion 24b of the skin 24.

Figure 11:
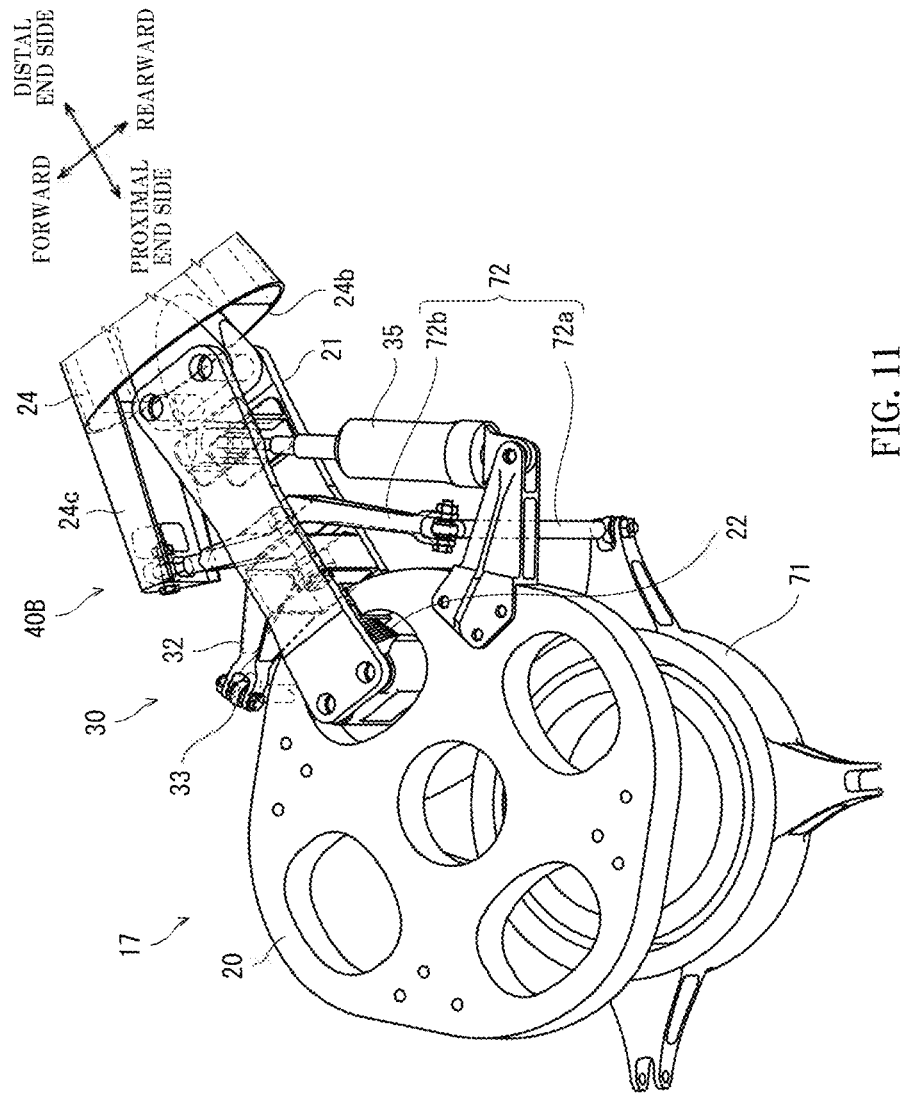
FIG. 11 is a perspective view showing yet another exemplary implementation of a blade-mounting portion.

FIG. 11 shows another exemplary implementation of a blade-mounting portion, torsion applying mechanism 40B. The torsion applying mechanism 40B is configured to apply torsional force to the proximal end portion 24b of the skin 24 not by driving the rotary actuator 41 mounted to the tension link 21, but by driving a second swash plate 71 and link members 72 (a first link member 72a and a second link member 72b, which constitute an arm). The second swash plate 71 is provided separately from the swash plate 31, which changes the pitch of the blade 18.

To be more specific, the torsion applying mechanism 40B shown in FIG. 11 includes the second swash plate 71 separately from (and in addition to) the above-described swash plate 31. Similar to the swash plate 31, the upward/downward motion and inclination of the second swash plate 71 are controllable. The lower end portion of the first link member 72a extending in the upward-downward direction is rotatably connected to a peripheral edge portion of the second swash plate 71. The first link member 72a is disposed near behind the tension link 21. The rear end portion of the second link member 72b extending in the forward-rearward direction is rotatably connected to the upper end portion of the first link member 72a. The leading edge portion 24c of the proximal end portion 24b of the skin 24 is rotatably connected to the front end portion of the second link member 72b. The second link member 72b is disposed in a manner to extend through the tension link 21 in the forward-rearward direction between the upper member 21a and the lower member 21b. A non-end portion of the second link member 72b in the longitudinal direction thereof is pivotally supported by the tension link 21.

Accordingly, when the second swash plate 71 is displaced, the second link member 72b moves like a lever in accordance with the displacement. At the time, a part of the tension link 21, the part pivotally supporting the second link member 72b, acts as a fulcrum. As a result, torsional force is applied to the proximal end portion 24b of the skin 24. Also in the example of FIG. 11, the link members 72 are disposed in the space between the lead-lag damper 35 and the hub body 20, and thus contribute to reduction in the size of the structure near the hub 17 of the main rotor 11.

It should be noted that the arrangement of the torsion applying mechanism 40B may be reversed in the forward-rearward direction. Specifically, the first link member 72a may be disposed near in front of the tension link 21; the front end portion of the second link member 72b extending in the forward-rearward direction may be rotatably connected to the upper end portion of the first link member 72a; and the trailing edge portion of the proximal end portion 24b of the skin 24 may be rotatably connected to the rear end portion of the second link member 72b.

The distal end portion of the spar 23 and the distal end portion of the skin 24 are directly connected to each other, but at their proximal end portions, the skin 24 is rotatably supported on the spar 23 via the bearings 51. This makes it possible to prevent the occurrence of unexpected displacement of the skin 24 when the rotary actuator 41 is driven or when the skin 24 receives aerodynamic force due to rotation of the main rotor 11.

As shown in FIG. 4, in a plan view, the dimension by which the spar 23 and the skin 24 are spaced apart from each other in the interior space 244 is greater at positions close to the proximal end portions of the spar 23 and the skin 24 than at positions close to the distal end portions of the spar 23 and the skin 24. Accordingly, when the torsion applying mechanism 40 (40A, 40B) is driven, portions of the skin 24 that are closer to the proximal end portion 24b are rotated and displaced to a greater degree than the other portions of the skin 24, and yet the skin 24 and the spar 23 can be prevented from coming into contact with each other.

It should be noted that the blade 18 of the example shown in FIG. 4 is configured such that, on the distal end side with respect to a specific position in the longitudinal direction (in FIG. 4, the specific position is a position near line VII-VII), the cross-sectional shape of the blade 18 forms an airfoil. It is designed such that, in the skin 24, from the proximal end portion 24b to the position near line VII-VII, the dimension of the spar 23 in the forward-rearward direction decreases gradually toward the distal end side, and similarly, the dimension of the interior space 244 of the skin 24 in the forward-rearward direction decreases gradually toward the distal end side. On the other hand, on the distal end side with respect to the position near line VII-VII, the dimension of the spar 23 in the forward-rearward direction and the dimension of the spar 23 in the upward-downward direction gradually increase, such that the gap formed in the interior space 244 of the skin 24 gradually decreases.

By configuring the airfoil segment of the blade 18 (in the case of the blade 18 of FIG. 4, the segment on the distal end side with respect to line VII-VII), such a gap as not to cause interference between the spar 23 and the skin 24 even when a specific torsional displacement of the skin 24 occurs (the torsional displacement decreases toward the distal end portion) can be formed in the skin, and the dimension of the spar 23 in the forward-rearward direction and the dimension of the spar 23 in the upward-downward direction can be made increase gradually. This makes it possible to increase the area of the closed cross section of the spar 23 (in the example of FIG. 7, ellipsoidal cross section), and gradually increase the torsional stiffness of the spar 23 toward the distal end side.

As described above, in the interior space of the skin 24 (i.e., in the front space 241 shown in FIG. 7), the cross-sectional area of the spar 23 according to the present disclosure is made as large as possible in consideration of the torsional displacement of the skin 24. Accordingly, the spar 23 can support reaction force due to torsion of the skin 24 with higher stiffness. Therefore, in realization of a rotor craft including a variable blade torsional angle mechanism, torsional deformation of the spar 23, which is unfavorable for the blade functions of the rotor mechanism, can be minimized.

In view of the above, the present application solves one or more problems of conventional technologies by providing a rotor craft that is capable of changing a torsional angle of a blade with a relatively simple configuration by suitably driving an actuator. Such a result is yielded even in a case that the actuator is a low-power actuator.

Embodiments of the present application include a rotor shaft that rotates; a plurality of blades that turn about the rotor shaft; a hub that couples the blades to the rotor shaft; and torsion applying mechanisms, each of which twists a proximal end portion of a corresponding one of the blades relative to a distal end portion of the corresponding blade about a center axis of the blade. Each of the blades includes: a spar constituted by a long shaft-shaped structural member, the spar including a proximal end portion connected to the hub; and a skin in which the spar is inserted, such that a distal end portion of the skin and a distal end portion of the spar are connected to each other, and such that other portions of the skin than the distal end portion are rotatable relative to the spar about a center axis of the spar. The hub includes: a hub body mounted to the rotor shaft; and a hub arm that connects the spar to the hub body.

The rotor craft with this configuration applies rotating force to the proximal end portion of the skin, thereby directly imparting a torsional angle to the proximal end portion of the skin. Therefore, the rotor craft can be realized with a simple configuration. Since the spar of the blade is connected to the hub separately from the skin, the torsional stiffness of the skin can be reduced compared to the conventional art. This makes it possible to apply a desired degree of torsion to the blade even with a relatively low output actuator. Since the rotor craft adopts a structure that supports torsional reaction force at the distal end of the skin via the spar, unfavorable torsional deformation other than torsional deformation of the skin can be reduced by utilizing high torsional stiffness of the spar.

The rotor craft may further include a pitch-changing mechanism, which changes a pitch of each blade of the plurality of blades. the pitch-changing mechanism may include: a swash plate; and a plurality of pitch links having a first end connected to the swash plate and having a second end connected to the hub arm.

The adoption of this configuration makes it possible to provide a rotor craft that is capable of changing the torsional angle of the blade and the pitch of the blade independently of each other with a simple configuration.

Each of the torsion applying mechanisms may include an actuator that applies rotating force about the center axis of the spar to a proximal end portion of the skin, the actuator being provided on the hub arm. Each of the torsion applying mechanisms may include an actuator that applies rotating force about the center axis of the spar to a proximal end portion of the skin, the actuator being provided at a position different from the hub arm. Alternatively, each of the torsion applying mechanisms may include a second swash plate that applies rotating force about the center axis of the spar to a proximal end portion of the skin.

Each of the torsion applying mechanisms may include an arm that connects between the actuator and a leading edge portion or a trailing edge portion of the proximal end portion of the skin. Each of the torsion applying mechanisms may include an arm that connects between the second swash plate and a leading edge portion or a trailing edge portion of the proximal end portion of the skin.

By adopting this configuration, rotating force can be applied to the leading edge portion or the trailing edge portion, each of which is away from the torsional center of the skin. This makes it possible to suppress increase in the size of the actuator.

At least a partial segment of the spar in a longitudinal direction of the spar may form a flattened cross-sectional shape, such that a dimension of the cross-sectional shape in a forward-rearward direction is greater than a dimension of the cross-sectional shape in an upward-downward direction. At least a portion of the skin, the portion being different from the distal end portion, may be rotatably supported on the spar via a bearing.

By adopting this configuration, the stiffness of the spar can be obtained. Also, the skin can be made rotatable relative to the spar, and other displacements of the skin relative to the spar than the rotational displacement can be suppressed assuredly.

The spar may have such a cross-sectional shape that, from a specific position in a longitudinal direction of the spar toward the distal end portion of the spar, a dimension of the cross-sectional shape in a forward-rearward direction and/or a dimension of the cross-sectional shape in an upward-downward direction increases gradually.

The present application is applicable to a rotor craft that is capable of changing the torsional angle of the blade. The torsional angle of the blade is changed with a relatively simple configuration by suitably driving an actuator, even if the actuator is low-powered.

From the foregoing explanation, many modifications and other embodiments of the present application are obvious to one skilled in the art. Therefore, the foregoing explanation should be interpreted only as an example and is provided for the purpose of teaching the best mode for carrying out the present application to one skilled in the art. The structures and/or functional details may be substantially modified within the scope of the present application.

REFERENCE SIGNS LIST 10 helicopter
11 main rotor
12 tail rotor
13 engine
14 main transmission
15 tail transmission
16 main rotor shaft (rotor shaft)
17 hub
18 blade (rotor blade)
19 tail drive shaft
20 hub body
21 hub arm (tension link)
21a upper member
21b lower member
22 connecting member
23 spar
23a distal end portion
24 skin
24a distal end portion
24b proximal end portion
24c leading edge portion
30 pitch-changing mechanism
31 swash plate
32 pitch arm
33 pitch link
35 lead-lag damper
40 torsion applying mechanism
40A torsion applying mechanism
40B torsion applying mechanism
41 rotary actuator (actuator)
42 twisting arm (arm)
50 filler
51 bearing
52 inner ring
53 outer ring
61 linear actuator
62 link member (arm)
63 fitting
71 second swash plate
72 link member (arm)
72a first link member
72b second link member
241 front space
242 rear space
243 dividing wall
244 interior space
A center axis

The invention claimed is:

1. A rotor craft, comprising:
   a rotor shaft;
   a plurality of blades that rotate about the rotor shaft;
   a hub that couples the plurality of blades to the rotor shaft; and
   a plurality of torsion applying mechanisms, each torsion applying mechanism of the plurality of torsion applying mechanisms twisting a proximal end portion of a corresponding blade of the plurality of blades relative to a distal end portion of the corresponding blade about a center axis of the blade, wherein
   each blade of the plurality of blades includes:
      a spar constituted by an elongated structural member, the spar including a proximal end portion that is connected to the hub; and
      a skin in which the spar is inserted, such that a distal end portion of the skin and a distal end portion of the spar are connected to each other, and such that portions of the skin other than the distal end portion are rotatable relative to the spar about a center axis of the spar, and
   the hub includes:
      a hub body mounted to the rotor shaft; and
      a hub arm that connects the spar to the hub body.

2. The rotor craft according to claim 1, further comprising a pitch-changing mechanism, which changes a pitch of each blade of the plurality of blades, and the pitch-changing mechanism including:

a swash plate; and
a plurality of pitch links having a first end connected to the swash plate and a second end connected to the hub arm.

3. The rotor craft according to claim 1, wherein each of the torsion applying mechanisms includes an actuator that applies rotating force about the center axis of the spar to a proximal end portion of the skin, the actuator being provided on the hub arm.

4. The rotor craft according to claim 1, wherein each of the torsion applying mechanisms includes an actuator that applies rotating force about the center axis of the spar to a proximal end portion of the skin, the actuator being provided at a position different from the hub arm.

5. The rotor craft according to claim 1, wherein each of the torsion applying mechanisms includes a second swash plate that applies rotating force about the center axis of the spar to a proximal end portion of the skin.

6. The rotor craft according to claim 3, wherein each of the torsion applying mechanisms further includes an arm that connects between the actuator and a leading edge portion or a trailing edge portion of the proximal end portion of the skin.

7. The rotor craft according to claim 5, wherein each of the torsion applying mechanisms includes an arm that connects between the second swash plate and a leading edge portion or a trailing edge portion of the proximal end portion of the skin.

8. The rotor craft according to claim 1, wherein
at least a partial segment of the spar in a longitudinal direction of the spar forms a flattened cross-sectional shape, such that a dimension of the cross-sectional shape in a forward-rearward direction is greater than a dimension of the cross-sectional shape in an upward-downward direction, and
at least a portion of the skin, the portion being different from the distal end portion, is rotatably supported on the spar via a bearing.

9. The rotor craft according to claim 1, wherein from a specific position in a longitudinal direction of the spar toward the distal end portion of the spar, a dimension of the cross-sectional shape in a forward-rearward direction and/or a dimension of the cross-sectional shape in an upward-downward direction increases gradually.

10. A rotor craft, comprising:
a rotor shaft;
a plurality of blades that rotate about the rotor shaft;
a hub that couples the plurality of blades to the rotor shaft; and
a plurality of actuators, each actuator of the plurality of actuators twisting a proximal end portion of a corresponding blade of the plurality of blades relative to a distal end portion of the corresponding blade about a center axis of the blade, wherein
each blade of the plurality of blades includes:
  a spar having an elongated shape, the spar including a proximal end portion that is connected to the hub; and
  a skin in which the spar is inserted, such that a distal end portion of the skin and a distal end portion of the spar are connected to each other, and such that portions of the skin other than the distal end portion are rotatable relative to the spar about a center axis of the spar, and
the hub includes:
  a hub body mounted to the rotor shaft; and
  a hub arm that connects the spar to the hub body.

11. The rotor craft according to claim 10, further comprising a pitch-changing device, which changes a pitch of each blade of the plurality of blades, and the pitch-changing device including:
a swash plate; and
a plurality of pitch links having a first end connected to the swash plate and a second end connected to the hub arm.

12. The rotor craft according to claim 10, wherein each of the actuators includes a rotary actuator that applies rotating force about the center axis of the spar to a proximal end portion of the skin, the actuator being provided on the hub arm.

13. The rotor craft according to claim 10, wherein
each of the actuators is provided at a position different from the hub arm, and
each of the actuators applies a rotating force about the center axis of the spar to a proximal end portion of the skin.

14. The rotor craft according to claim 10, wherein each of the actuators includes a second swash plate that applies rotating force about the center axis of the spar to a proximal end portion of the skin.

15. The rotor craft according to claim 12, wherein each of the actuators further includes an arm that connects between the actuator and a leading edge portion or a trailing edge portion of the proximal end portion of the skin.

16. The rotor craft according to claim 13, wherein each of the actuators further includes an arm that connects between the actuator and a leading edge portion or a trailing edge portion of the proximal end portion of the skin.

17. The rotor craft according to claim 14, wherein each of the actuators includes an arm that connects between the second swash plate and a leading edge portion or a trailing edge portion of the proximal end portion of the skin.

18. The rotor craft according to claim 10, wherein
at least a partial segment of the spar in a longitudinal direction of the spar forms a flattened cross-sectional shape, such that a dimension of the cross-sectional shape in a forward-rearward direction is greater than a dimension of the cross-sectional shape in an upward-downward direction, and
at least a portion of the skin, the portion being different from the distal end portion, is rotatably supported on the spar via a bearing.

19. The rotor craft according to claim 10, wherein from a specific position in a longitudinal direction of the spar toward the distal end portion of the spar, a dimension of the cross-sectional shape in a forward-rearward direction and/or a dimension of the cross-sectional shape in an upward-downward direction increases gradually.

20. An assembly for a rotor craft, the assembly comprising:
a rotor shaft;
a hub that couples the rotor shaft to a plurality of blades of the rotor craft; and
a plurality of actuators, each actuator of the plurality of actuators twisting a proximal end portion of a corresponding blade of the plurality of blades relative to a distal end portion of the corresponding blade about a center axis of the blade, wherein
each blade of the plurality of blades includes:
  a spar having elongated shape, the spar including a proximal end portion that is connected to the hub; and
  a skin in which the spar is inserted, such that a distal end portion of the skin and a distal end portion of the spar are connected to each other, and such that portions of the skin other than the distal end portion are rotatable relative to the spar about a center axis of the spar, and the hub includes:
  a hub body mounted to the rotor shaft; and
  a hub arm that connects the spar to the hub body.

* * * * *